(12) United States Patent
Nania et al.

(10) Patent No.: US 7,938,670 B2
(45) Date of Patent: May 10, 2011

(54) METHOD OF MOUNTING A CONNECTOR ASSEMBLY

(75) Inventors: Francesco A. Nania, Clinton, MA (US); Christopher Coughlan, Hudson, MA (US); Arnold S. Feinberg, Stoughton, MA (US); Thomas H. Kannally, Jr., Northborough, MA (US); Vadim L. Radunsky, Framingham, MA (US)

(73) Assignee: Hypertronics Corporation, Hudson, MA (US)

( * ) Notice: Subject to any disclaimer, the term of this patent is extended or adjusted under 35 U.S.C. 154(b) by 0 days.

(21) Appl. No.: 12/654,258

(22) Filed: Dec. 15, 2009

(65) Prior Publication Data

US 2010/0144183 A1 Jun. 10, 2010

Related U.S. Application Data

(60) Division of application No. 11/987,090, filed on Nov. 27, 2007, now Pat. No. 7,661,995, which is a continuation of application No. 10/770,670, filed on Feb. 2, 2004, now Pat. No. 7,326,091.

(60) Provisional application No. 60/445,932, filed on Feb. 7, 2003.

(51) Int. Cl.
*H01R 13/627* (2006.01)
(52) U.S. Cl. ....................................................... 439/354
(58) Field of Classification Search .................. 439/161, 439/680, 901, 354, 598, 681
See application file for complete search history.

(56) References Cited

U.S. PATENT DOCUMENTS

| | | | |
|---|---|---|---|
| 2,410,618 | A | 11/1946 | Zelov |
| 3,287,031 | A | 11/1966 | Simmons et al. |
| D225,740 | S | 1/1973 | Thompson |
| 3,810,073 | A | 5/1974 | Zajac et al. |
| 4,155,619 | A | 5/1979 | Bray et al. |
| 4,191,443 | A | 3/1980 | Doyle |
| 4,229,064 | A | 10/1980 | Vetter et al. |
| 4,268,115 | A | 5/1981 | Slemon et al. |
| 4,316,647 | A | 2/1982 | Bailey et al. |
| 4,330,166 | A | 5/1982 | Cooper et al. |
| 4,412,717 | A | 11/1983 | Monroe |
| 4,422,716 | A | 12/1983 | Morimoto et al. |
| 4,448,470 | A | 5/1984 | Peterson |
| 4,472,012 | A | 9/1984 | Michaels |
| 4,614,029 | A | 9/1986 | Neumann et al. |
| 4,647,127 | A | 3/1987 | Weingartner |
| 4,657,327 | A | 4/1987 | Weingartner |
| 4,685,758 | A | 8/1987 | Yoshida |
| 4,708,662 | A | 11/1987 | Klein |
| 4,726,788 | A | 2/1988 | F'Geppert |
| 4,762,389 | A | 8/1988 | Kaihara |
| 4,770,443 | A | 9/1988 | Yamamoto |
| D300,425 | S | 3/1989 | Sumita |
| 4,812,136 | A | 3/1989 | Molitor |
| 4,820,204 | A | 4/1989 | Batty |
| 4,834,678 | A | 5/1989 | Emadi et al. |
| 4,891,021 | A | 1/1990 | Hayes et al. |
| 4,915,421 | A | 4/1990 | Dennany, Jr. |
| 4,936,662 | A | 6/1990 | Griffin |

(Continued)

*Primary Examiner* — Phuong K Dinh
(74) *Attorney, Agent, or Firm* — Finnegan, Henderson, Farabow, Garrett & Dunner, LLP

(57) ABSTRACT

A connector for electrical or optical conduits that provides a field configurable keying of the insulator plugs relative to each other and relative to the connector casings. A separate relative keying means is included that is separate from the case keying or locating mechanism. The connector also utilizes a retention means for example, a one-way snap apron, to retain the insulator within the receptacle case.

20 Claims, 10 Drawing Sheets

U.S. PATENT DOCUMENTS

| | | | |
|---|---|---|---|
| 4,938,718 A * | 7/1990 | Guendel | 439/680 |
| 5,042,891 A | 8/1991 | Mulholland et al. | |
| 5,067,909 A | 11/1991 | Behning | |
| 5,101,463 A | 3/1992 | Cubukciyan et al. | |
| 5,127,843 A | 7/1992 | Henry et al. | |
| 5,195,905 A | 3/1993 | Pesci | |
| D335,122 S | 4/1993 | Hughes | |
| 5,212,752 A | 5/1993 | Stephenson et al. | |
| 5,265,183 A | 11/1993 | Feng et al. | |
| 5,288,243 A | 2/1994 | Mergless | |
| 5,356,315 A | 10/1994 | Jankowski et al. | |
| 5,394,494 A | 2/1995 | Jennings et al. | |
| 5,449,302 A | 9/1995 | Yarbrough et al. | |
| D368,697 S | 4/1996 | Hoard | |
| D372,221 S | 7/1996 | Anthony | |
| 5,637,010 A | 6/1997 | Jost et al. | |
| 5,666,970 A | 9/1997 | Smith | |
| 5,683,270 A | 11/1997 | Warislohner | |
| 5,704,809 A | 1/1998 | Davis | |
| 5,727,963 A | 3/1998 | LeMaster | |
| 5,746,619 A | 5/1998 | Harting et al. | |
| D399,188 S | 10/1998 | Lin | |
| D399,189 S | 10/1998 | Lin | |
| 5,888,083 A * | 3/1999 | Seilhan et al. | 439/161 |
| 5,890,929 A | 4/1999 | Mills et al. | |
| D415,469 S | 10/1999 | Lee | |
| 5,984,378 A | 11/1999 | Ostrander et al. | |
| D420,644 S | 2/2000 | Nemser et al. | |
| 6,045,404 A | 4/2000 | Myer | |
| 6,056,577 A | 5/2000 | Blanchet | |
| 6,102,907 A | 8/2000 | Smethers et al. | |
| D434,003 S | 11/2000 | Brisson | |
| 6,161,579 A | 12/2000 | Vulliet | |
| D438,844 S | 3/2001 | Meyer et al. | |
| 6,290,525 B1 | 9/2001 | Jacobi | |
| 6,296,508 B1 | 10/2001 | Kuwahara et al. | |
| 6,416,334 B1 | 7/2002 | Plishner | |
| D462,662 S | 9/2002 | Lundekugel | |
| 6,454,613 B2 | 9/2002 | Valceschini | |
| 6,508,669 B2 | 1/2003 | Wang | |
| 6,648,686 B2 | 11/2003 | Nishimoto | |
| 6,722,922 B2 | 4/2004 | Cykon | |
| D494,136 S | 8/2004 | Vesecky | |
| D509,474 S | 9/2005 | Bihrer | |
| D512,965 S | 12/2005 | Dobler | |
| 7,048,586 B2 | 5/2006 | Ishizaki et al. | |
| D527,346 S | 8/2006 | Brodin | |
| D559,785 S | 1/2008 | Tosetti | |
| 7,326,091 B2 | 2/2008 | Nania et al. | |
| D585,837 S | 2/2009 | Kuehne | |
| D596,127 S | 7/2009 | Nania | |
| 2002/0182924 A1 | 12/2002 | Mo | |

* cited by examiner

METHOD OF MOUNTING A CONNECTOR ASSEMBLY

DOMESTIC PRIORITY CLAIM

This application is a divisional of U.S. patent application Ser. No. 11/987,090, filed Nov. 27, 2007, now U.S. Pat. No. 7,661,995 which has been allowed and which is a continuation of U.S. patent application Ser. No. 10/770,670, filed Feb. 2, 2004, now U.S. Pat. No. 7,326,091, which claims the benefit of U.S. Provisional Application No. 60/445,932, filed Feb. 7, 2003, each of which is incorporated herein by reference in its entirety.

BACKGROUND OF THE INVENTION

1. Field of the Invention

The present invention relates to a connector, and more particularly, a connector that mates with a conjugate connector in order to link a first and second signal conduction means which terminates in each of the connectors. This system is configurable in that the particular location and operation of a keying mechanism is separate, relative to the case and insulator.

2. Description of the Related Art

Such connectors are utilized mainly, but not exclusively, for electrical conductors or optical fibers or even a combination of the two. Any floating or uncontrolled positioning of either the angular or axial movement of the insulator blocks located therein may compromise the quality of the connection.

Additionally, and more importantly, prior art keying schemes between such receptacle and plug assemblies are supplied to offer a number of fixed keying configurations or to particular customer specifications. Such manufactured systems prevent customer selection of a particular orientation of the keying means and relative insulator positioning. Further, such assemblies in the past have not been able to change their keying arrangement in the field or once obtained by the customer.

Connectors are utilized in various fields anywhere particular electric or optical signals or leads need to be conducted. Connectors are typically of two types, one being a so called push-pull type, comprising a male connector and female connector, which allows coupling between two axially moveable bodies and/or insulators. The outer body or plug assembly makes it possible to control a lock and pushing by which the two connectors of conjugate type may be locked together by pushing in one direction and unlocking by pulling out of body. The other type of connector relates to those with other connection means, such as snap fastening of one connection to the other or an equivalent thereof. The insert located within respective receptacle or plug assembly may be termed an insulator, even when the particular function does not insulate, for example for separation of the signal leads.

What is needed in the art is a connector having a configurable, selectable keying relative to the insulator and casing thereby allowing the end user to select their own keying schemes.

SUMMARY OF THE INVENTION

The present invention satisfies the need for a connector by providing a field configurable keying of the insulator plugs relative to each other and relative to the connector casings. The present system includes separate relative keying means that are separate from the case keying or locating mechanism.

Additionally, the present invention utilizes a retention means for example, a one-way snap apron, to retain the insulator within the receptacle case. The present invention also allows the selectable connection between a customer's equipment case or box utilizing either a front mounting installation or a rear mounting installation. One additional feature of the present invention is that the invention has an ability to utilize a fastening mechanism separate from either the casing or the insulator blocks.

The present invention, in one form thereof, utilizes a double beam supported catch for interlocking the plug assembly with the receptacle assembly. Further features of the invention allow particular RF or EMF shielding of locations of the connector assembly as needed or desired.

An advantage of the present invention is that the end user of the connector is allowed to select the orientation of the keying insulator or block of the plug and receptacle relative to the respective cases. The prior art having fixed keying, required manufacturers to manufacture different keying combinations and stock many different types of manufactured connectors.

Another advantage of the present invention is the utilization of a retention means such as a one-way apron, allows a non-removable connection between the receptacle insulator and receptacle casing.

Yet another advantage of the present invention is that by adding several selectable keying positions between the relative insulator blocks, casing, and latching mechanism, incorrect plug attachment or location is prevented.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1A:
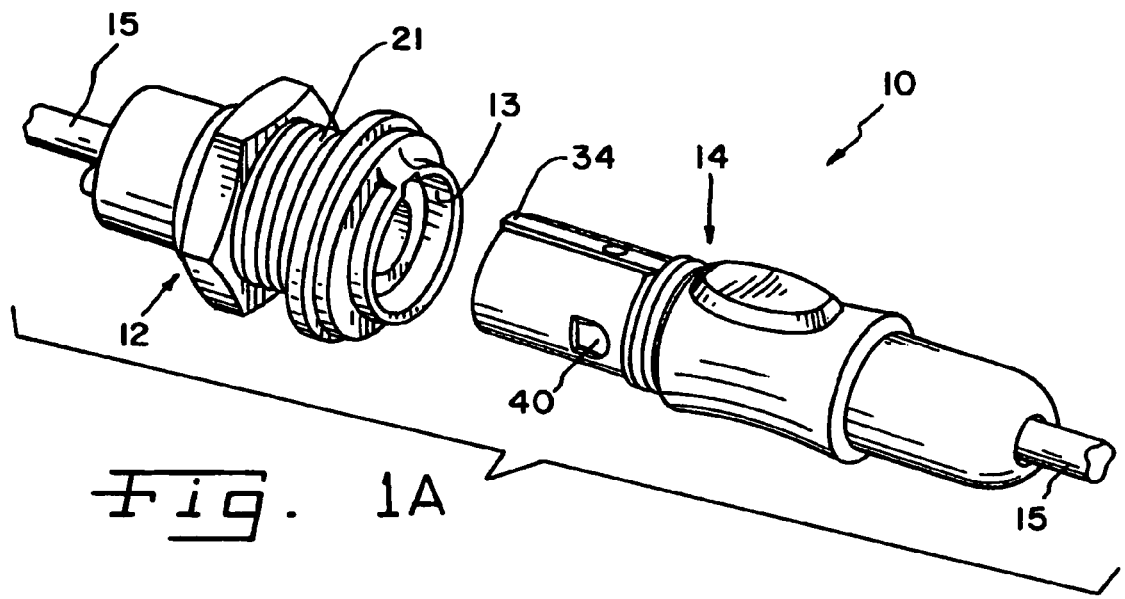
FIG. 1A is a perspective view of a connector assembly of the present invention.

FIG. 1A shows connector assembly 10 of the present invention. FIG. 1A utilizes receptacle assembly 12 and plug assembly 14 which are interfit to make a connection between two electrical or optical conduits or cables 15. The style of connector assembly 10 is that of a push-pull connection, although alternate styles may be utilized.

Figure 1B:
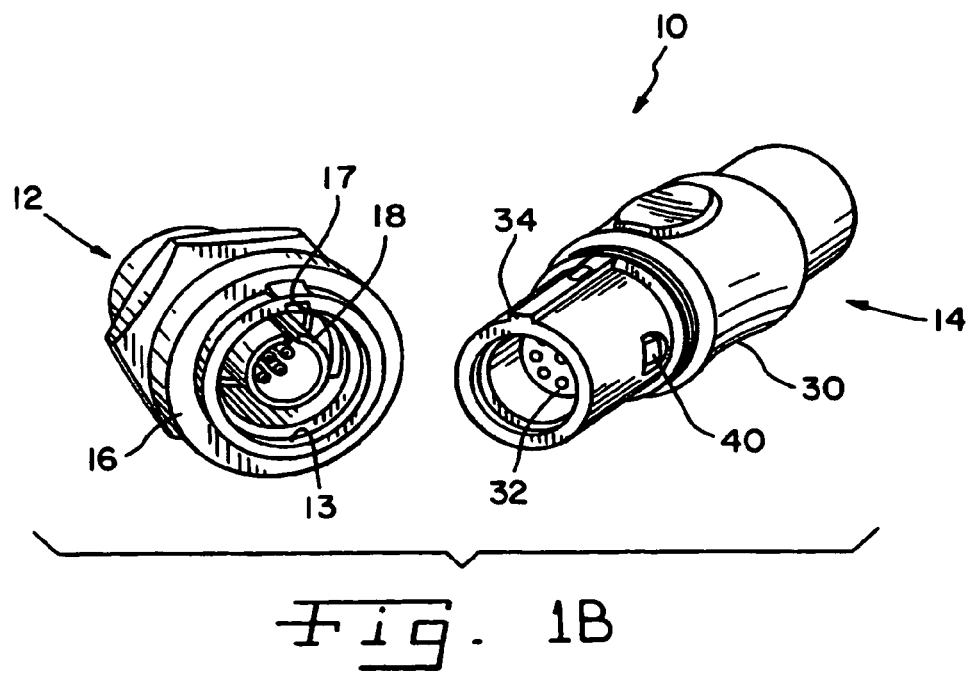
FIG. 1B is a perspective view of the connector assembly of the present invention viewing the mating insulators.
Figure 1C:
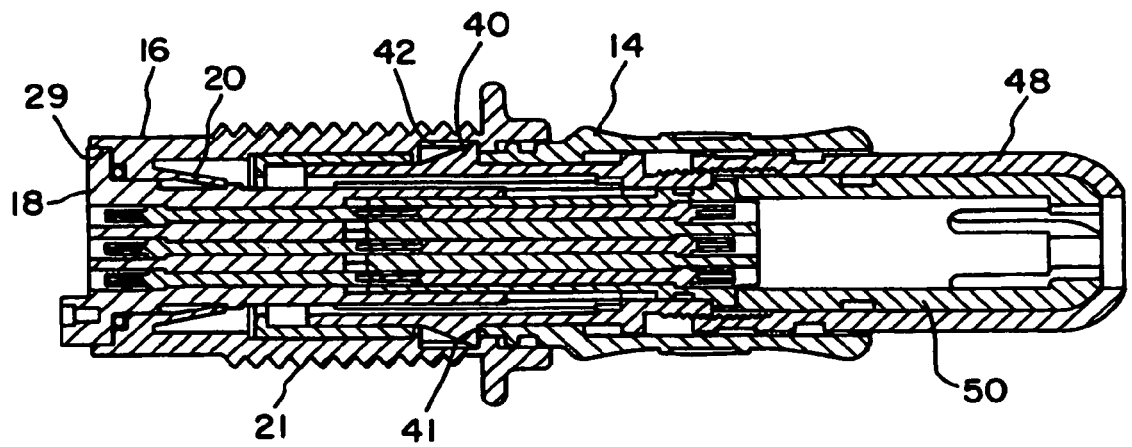
FIG. 1C is a sectional view of an alternate connector assembly.

In FIG. 1B, receptacle assembly 12 is shown with an interfit receptacle insulator 18, later described. Plug assembly 14 as shown in FIG. 1B includes a plug case 30 having an interfit plug insulator 32. Plug case 30 includes a key 34 that slides into a corresponding groove 17 in receptacle case 16. This key 34 and groove 17 create and guide the relative orientation of the receptacle case 16 and plug case 30 when the connector assemblies are interfit. Also shown in FIG. 1C, emerging from plug case 30 is one of two radially opposed catches or ears 40 that interfit within a port or opening 42 within receptacle case 16.

Figure 2:
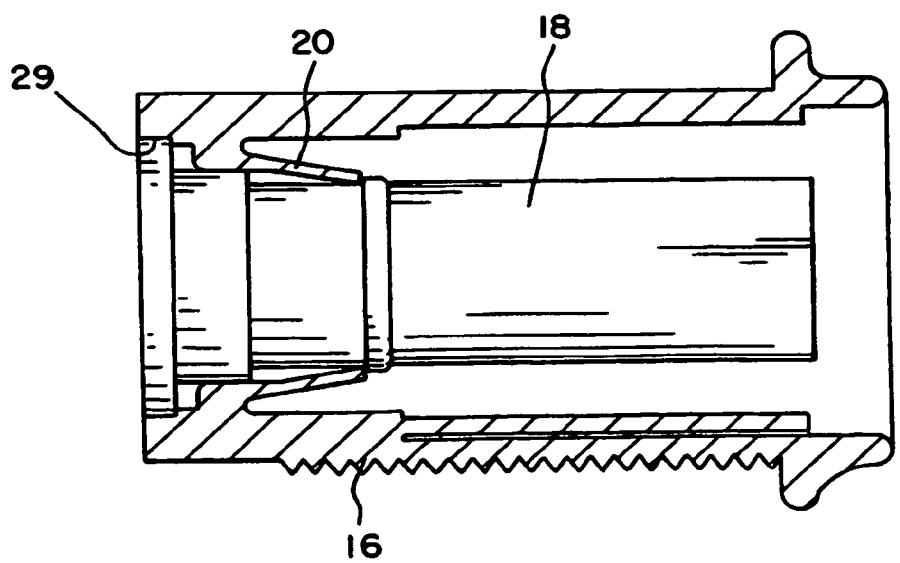
FIG. 2 is an enlarged view of the receptacle insulator and retention means of the connector assembly of FIG. 1A.
Figure 3A:
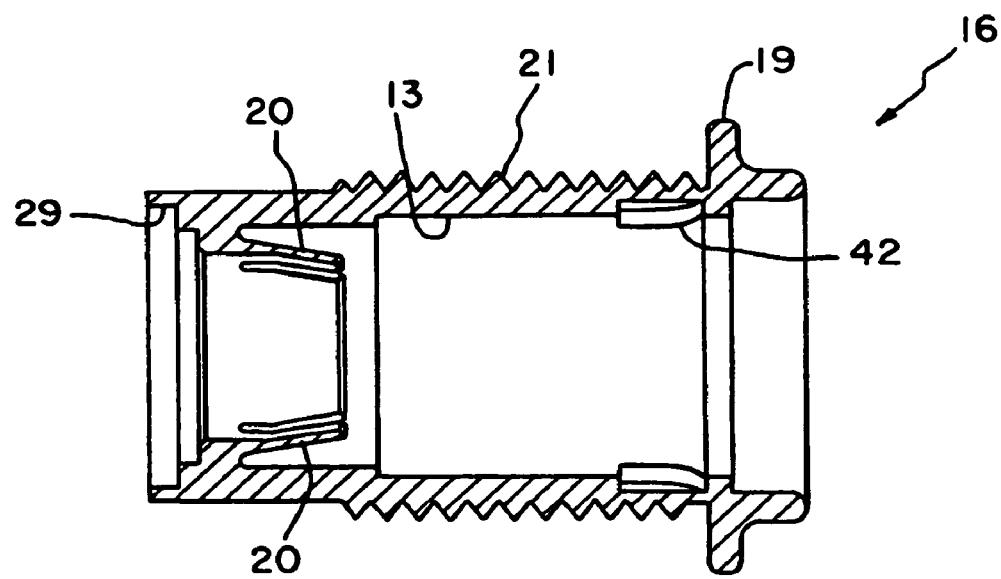
FIG. 3A is a sectional view of the receptacle case in one form of the present invention.

Directing attention now to receptacle case 16 in FIG. 2, one feature of the present invention is shown, that of the retention means 20 for retaining receptacle insulator 18 therein. In one form of the present invention, retention means 20 is that of a snap apron formed by a radially inwardly pointing web, as more clearly shown in FIGS. 3A and 3B. As shown in FIG. 3A, for example, the outer surface of receptacle case 16 includes a boss or shoulder 19 and threads 21. Receptacle case 16 may further include a colored o-ring or washer for sealing with plug assembly 14.

Figure 4A:
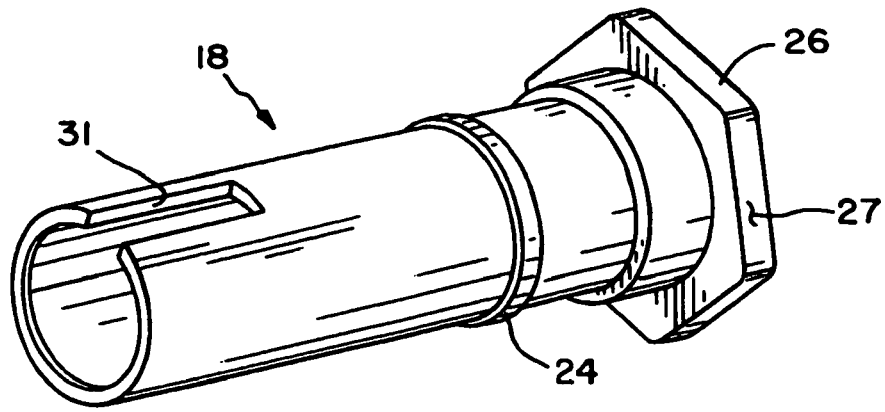
FIG. 4A is a rear perspective view of the receptacle insulator of the present invention.
Figure 4B:
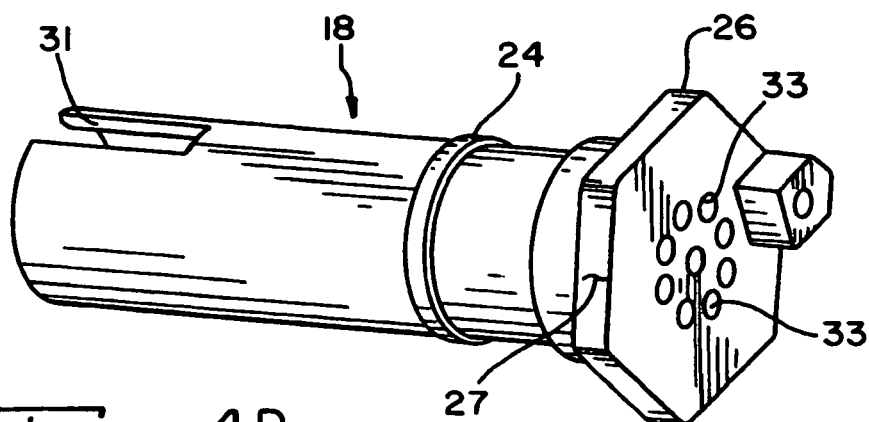
FIG. 4B is a front perspective view of the receptacle insulator of the present invention.

FIGS. 4A and 4B show the construction of the receptacle insulator 18 which stands as a hollow cylindrical shape (as shown, other shapes such as a hexagon may be equivalently utilized), having a ring or protrusion 24 around the periphery of the outer surface. Receptacle insulator 18 is sized to interfit within the bore 13 of receptacle case 16, such that when so co-located, receptacle insulator 18 engages retention means 20 and insulator ring 24. Once pushed through and into bore 13, the retention means 20 or web prevents or inhibits removal of receptacle insulator 18 from receptacle case 16. Other styles of retention mechanisms may be useful.

Figure 3B:
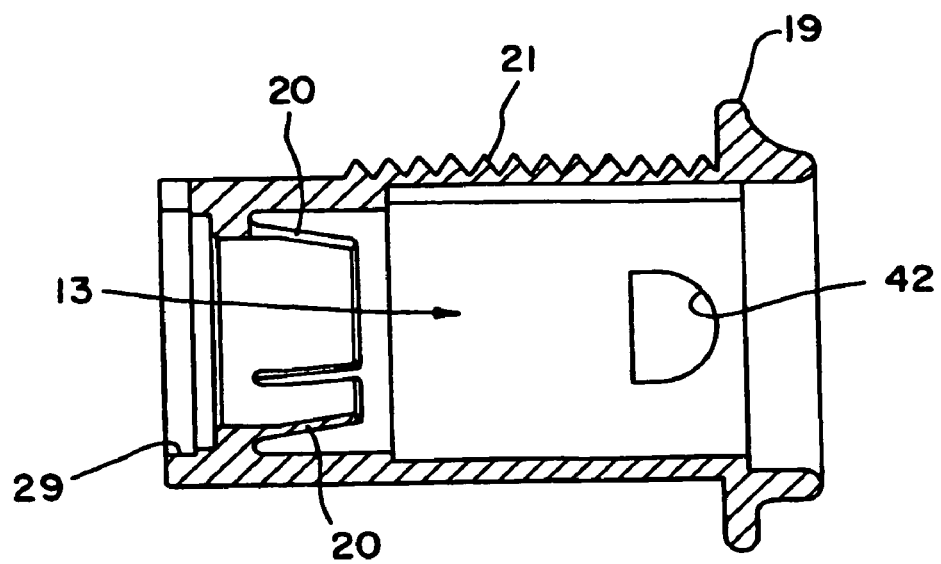
FIG. 3B is an alternate sectional view of the receptacle case of FIG. 1A.
Figure 4C:
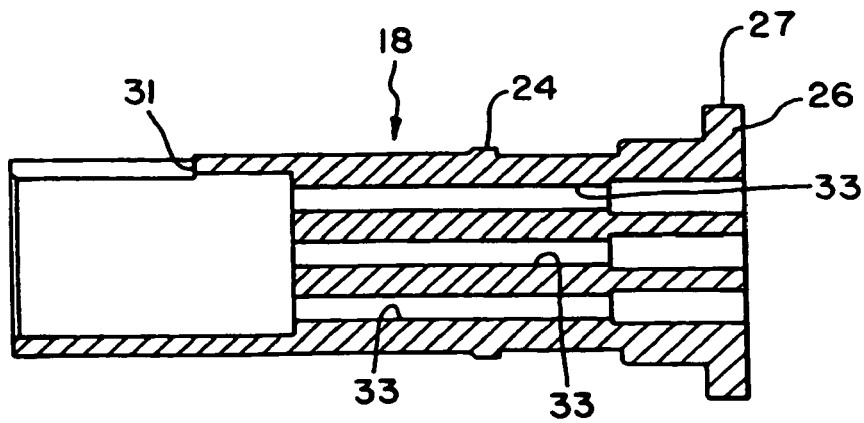
FIG. 4C is a cross-sectional view of the receptacle insulator of the present invention.

As shown in FIGS. 3A and 3B, receptacle insulator 18 also includes a particular geometry head 26 having a peripheral surface 27. The particular geometry of head 26 is further formed in a cutout 29 of receptacle case 16 into which head 26 interfits. The engagement of peripheral surface 27 with the cutout 29 prevents relative rotational movement between insulator 18 and receptacle case 16. As shown in FIGS. 4A-C, receptacle insulator 18 includes a groove or keyway 31 for engagement with plug insulator 32 to be described later. As shown in FIGS. 4B and 4C, receptacle insulator 18 includes bores 33 through which past conventional electrical or optical leads (not shown).

The particular geometry of head 26 permits relative indexing or selectable keying upon insertion into receptacle insulator 18. For example, the embodiment shown in FIG. 4A utilizes a six-sided head 26. This six-sided head allows for six different radial positions relative to receptacle case 16 upon insertion. This freedom of selection allows a consumer to assemble receptacle assembly 12 for their particular keying needs. Such radial indexing changes the relative radial location of groove or keyway 31 relative to receptacle case 16.

Figure 5A:
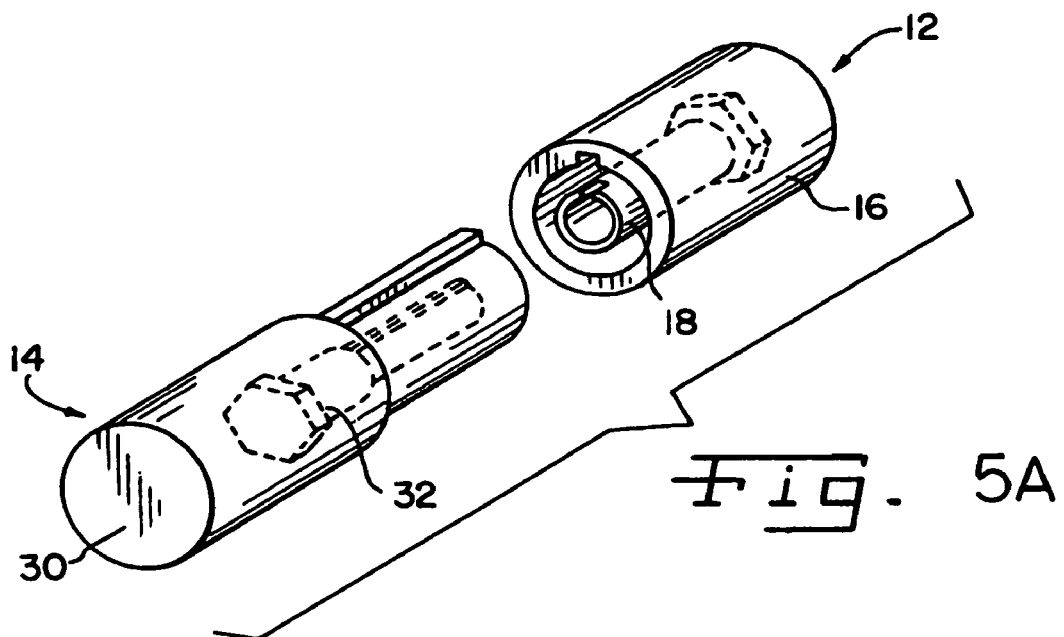
FIGS. 5A and 5B show a diagrammatic view of one aspect of the present invention showing the selectable keying feature.
Figure 5B:
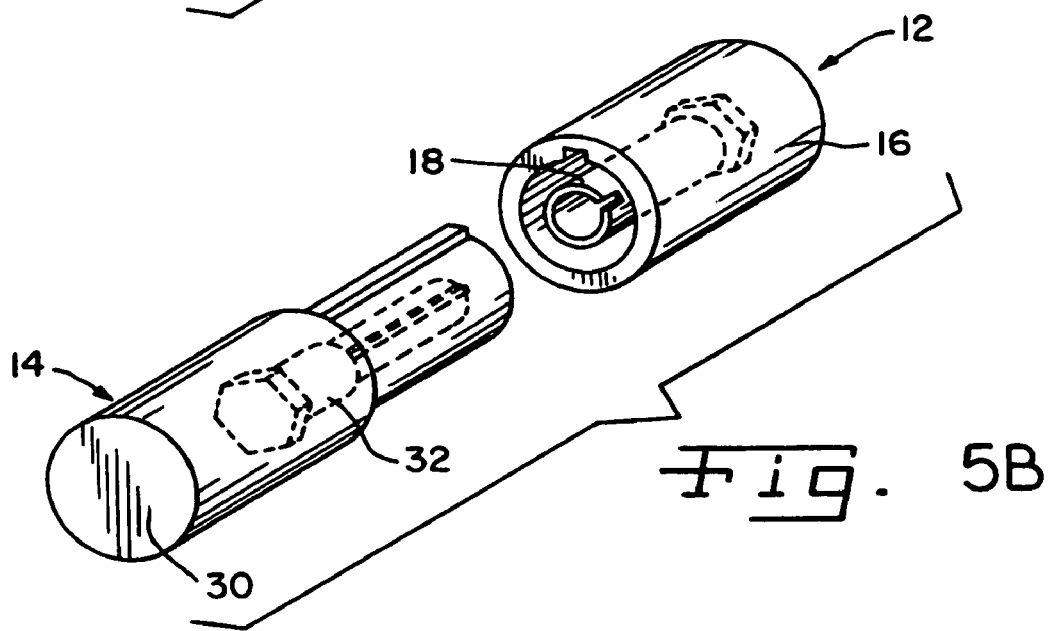

The configurable keying feature of the present invention is diagrammatically shown in FIGS. 5A and 5B in which, for example, by having a six-sided head 26 allows for six different keying positions after the receptacle insulator 18 and receptacle case 16 are delivered to the customer. The prior art connectors utilized keys that are specified by the customer when the product is purchased and supplied by the connector manufacturer as a particular fixed feature. During utilization by the customer, the relative locations of the insert are selectable based upon client's needs. As shown in FIGS. 5A and 5B, the radial position of plug insulator 32 is also selectable. Alternatively, other geometries of head 26 may be utilized.

Figure 5C:
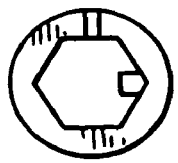
FIGS. 5C and 5D show axial end views of the assembled arrangement of the receptacle insulator and plug insulator disposed at different rotary orientations relative to the cases as a result of different keying positions, according to the selectable keying feature illustrated by FIGS. 5A and 5B.
Figure 5D:
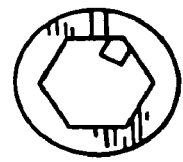

FIGS. 5C and 5D show axial end views of the assembled arrangement of the receptacle insulator 18 and plug insulator 32 disposed at different rotary orientations relative to the respective cases, based on the selectively configurable keying feature depicted illustratively in FIGS. 5A and 5B. As shown by FIGS. 5C and 5D, different keying positions for the insulators are possible.

Figure 6:
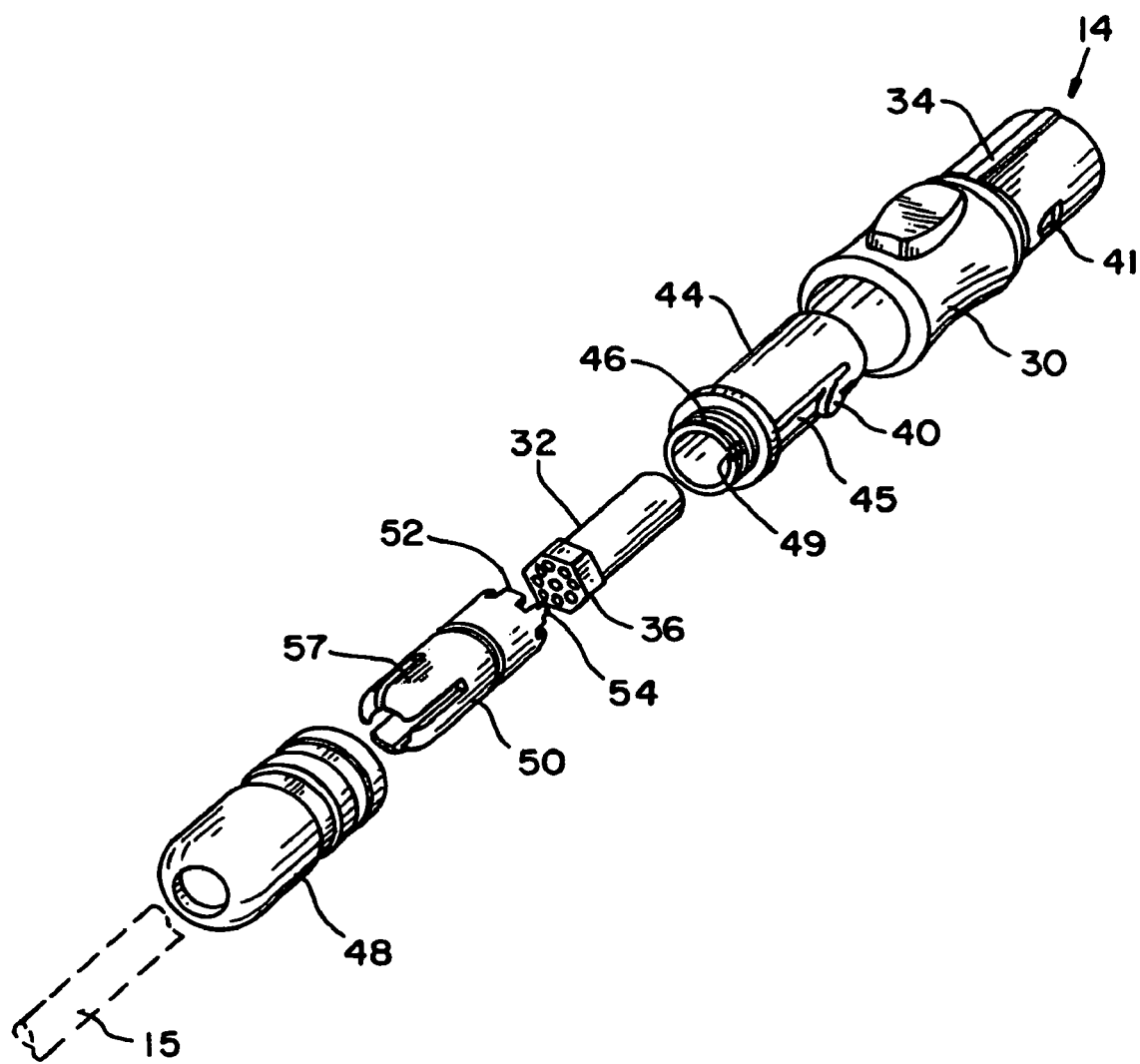
FIG. 6 is an exploded perspective view of one form of the connector assemble of the present invention.

Plug assembly 14, shown in FIG. 6, comprises a plug case 30 including ports or orifices 41 through which ears 40 of a cylindrically hollow shaped latching plug are pushed through. Latching plug 44 is the element of plug assembly 14 on which ears 40 are actually formed, and more importantly on a particular double cantilever beam extension 45. A beam supported at both ends portion of latching plug 44 is formed integrally with latching plug 44 on opposite radial portions of latching plug 44 as more clearly shown in FIG. 1C. Beam 45 creates a mechanism through which ears 40 radially may be retracted with movement of case 30. Returning to FIG. 6, latching plug 44 also includes a threaded end 46 which attaches to a cable grip adjuster 48.

Figure 7:
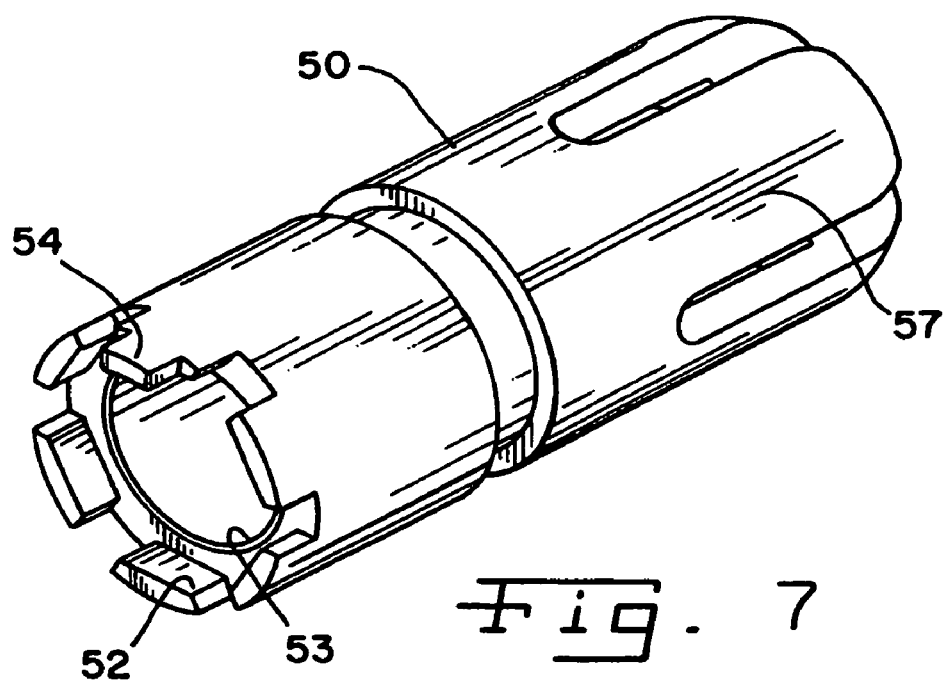
FIG. 7 is a perspective view of the insulator positioner.

To successfully and accurately locate plug insulator 32 within plug assembly 14, an insulator positioner 50 is utilized. As shown in FIG. 7, insulator positioner 50 includes at one end, a castellated feature or geometric shape 52, such as protuberances or shoulders about bore 53, that interfit a complimentary, geometrically formed head 36 of plug insulator 32. The surface of feature 52 prevents relative rotation by contacting and interfering with a peripheral surface 37 on plug insulator 32. Insulator positioner 50 further includes a key means such as tab 54 which interfits with a groove or keyway 49 on latching plug 44. This prevents relative rotation when assembled between the latching plug and insulator positioner 50 and because of feature 52 and surface 37, therefore additionally preventing relative rotation of plug insulator 32. The build up of these features allows the ultimate customer to selectively select the relative indexing or relative displacement of plug insulator 32 relative to plug assembly 14.

Figure 8A:
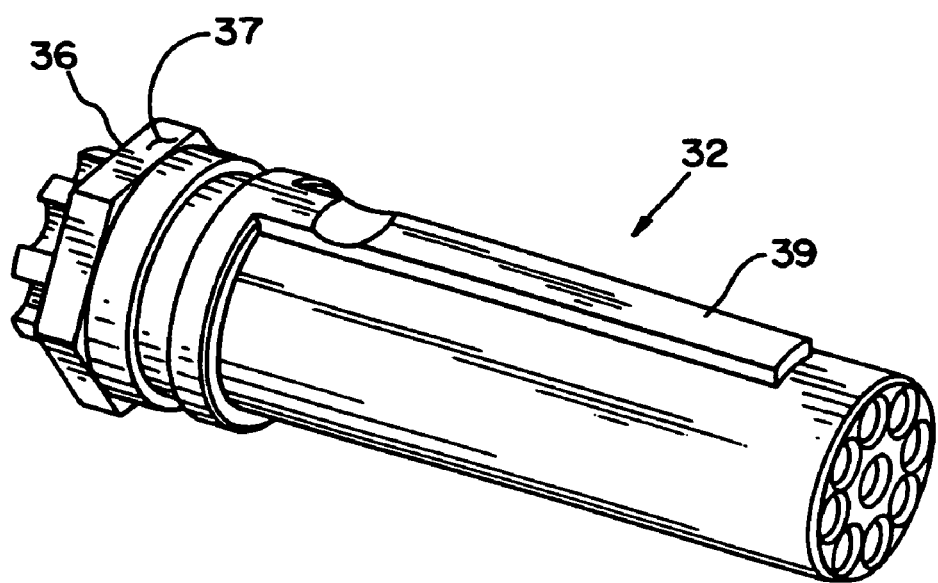
FIG. 8A is a perspective side view of the plug insulator.
Figure 8B:
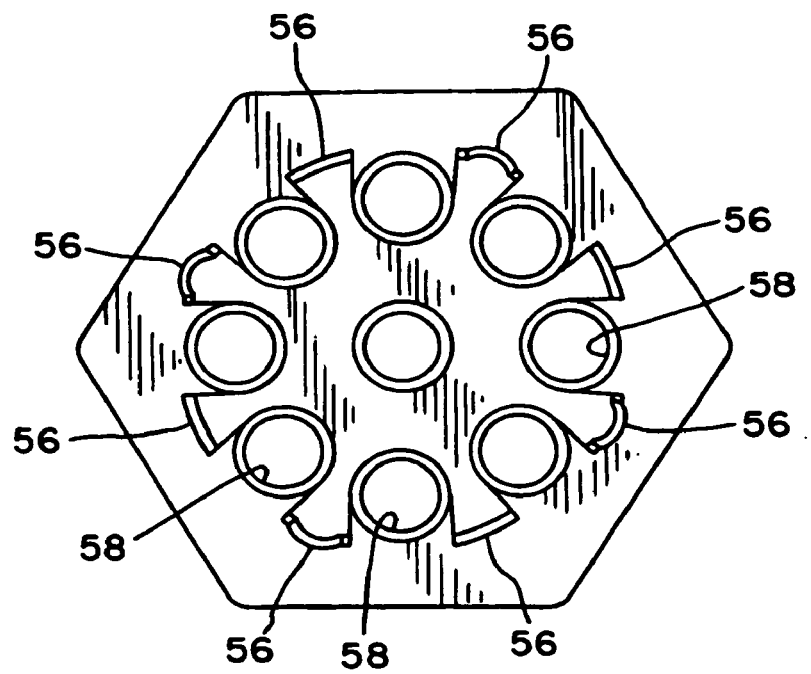
FIG. 8B is a front elevational view of the plug insulator of the present invention showing the temporary fastening means for use with the plug insulator positioner.
Figure 8C:
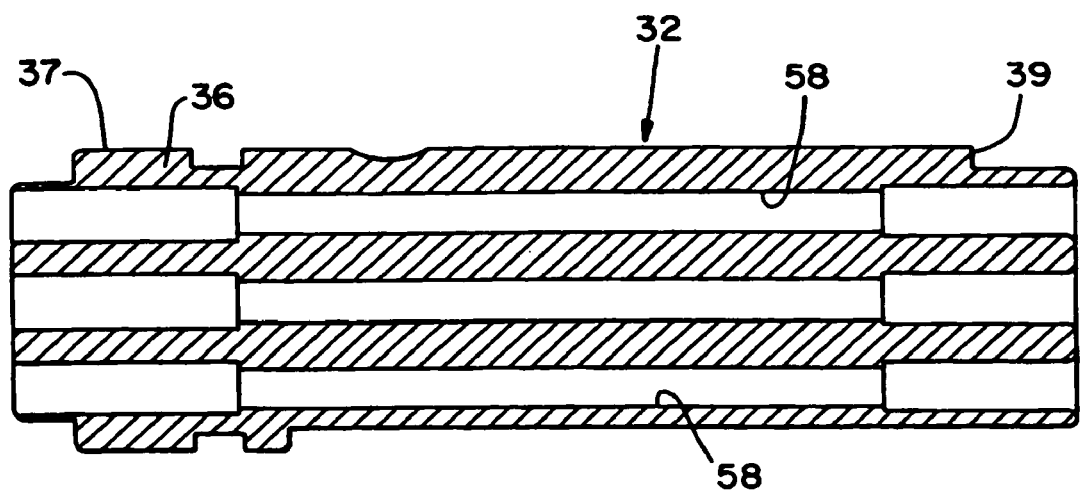
FIG. 8C is a sectional view of the plug insulator.

Generally, plug insulator 32 as shown in FIGS. 8A-8C, is formed of a substantially cylindrical member having a raised portion or key 39 which interfits into groove or keyway 31 in receptacle insulator 18. Such key and keyway combination 39, 31 permits accurate relative radial location and positioning between the insulators 18, 32.

For ease of assembly, there are raised arcuate portions 56 located about the lead bores 58 on plug insulator 32. Such arcuate raised portions 56 are utilized to interfit with bore 53 such that during assembly of the cable and leads therethrough, an interference fit is created between insulator positioner 50 and plug insulator 32. This interference or press fit connection increases the ability to handle the subassembly, during assembly of plug assembly 14. Lead bores 58 through plug insulator 52 are conventional in nature.

The assembly of plug 14 is best shown in FIG. 6, as now described. The operator will take a cable 15 with leads and pass such cable through the cable grip adjuster 48. The leads and cable will then be passed through insulator positioner 50 with the leads then inserted, into plug assembly 32. When the operator has selected the relative indexes between plug insulator 32 and plug case 30 the operator will interfit plug insulator 32 into insulator positioner 50 forcing positioning head 36 and peripheral surface 37 into the feature 52, thereby preventing relative rotation between the parts. The arcuate projections 56 will form a temporary interference fit as they are pushed into bore 53 thereby forming a subassembly of the plug insulator positioner.

Next the plug insulator/insulator positioner subassembly will be slid into the latching plug with the positioner alignment tab 54 interfitting into the keyway 49 on the latching plug 44. Cable grip adjuster 48 will then be slid and connected, for example, via threads 46 to latching plug 44.

At this time, the subassembly so developed shall be pushed into plug case 30 to permit ears 40 to pass through radial opposite ports 41 in plug case 30. Such ears 40 extend out past the outer radial peripheral surface of plug 30 thereby allowing ears 40 to additionally enable relative locking between plug assembly 14 and receptacle assembly 12. With such insertion of latching plug 44 into plug case 30, plug assembly 14 is complete and ready for insertion into receptacle assembly 12 to complete connector assembly 10. The sub-connection of cable grip adjuster 46 and its attachment to latching plug 44 causes fingers 57 formed from radial cuts or grooves within insulator positioner 50, to collapse about cable 15, as the fingers 57 interfere with the interior surface of cable grip adjuster 48. This permits a firm grasp or connection between cable 15 and plug assembly 14 eliminating or reducing possible axial forces between the inserted leads, plug insulator 32, and cable 15.

Figure 9A:
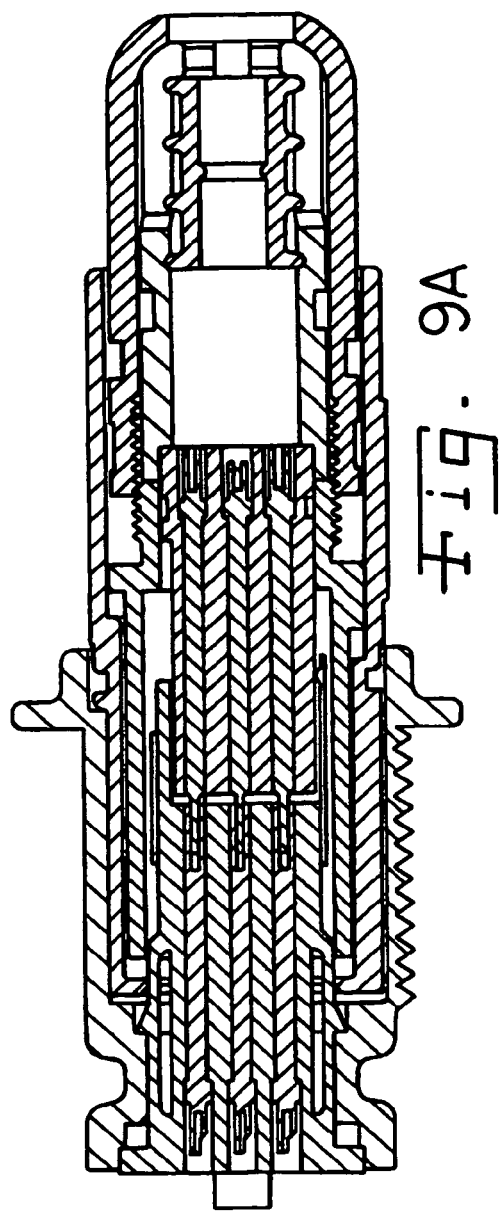
FIGS. 9A and 9B are sectional views of an alternate form of the invention showing means of RF and EMF shielding disposed within the connector assembly.
Figure 9B:
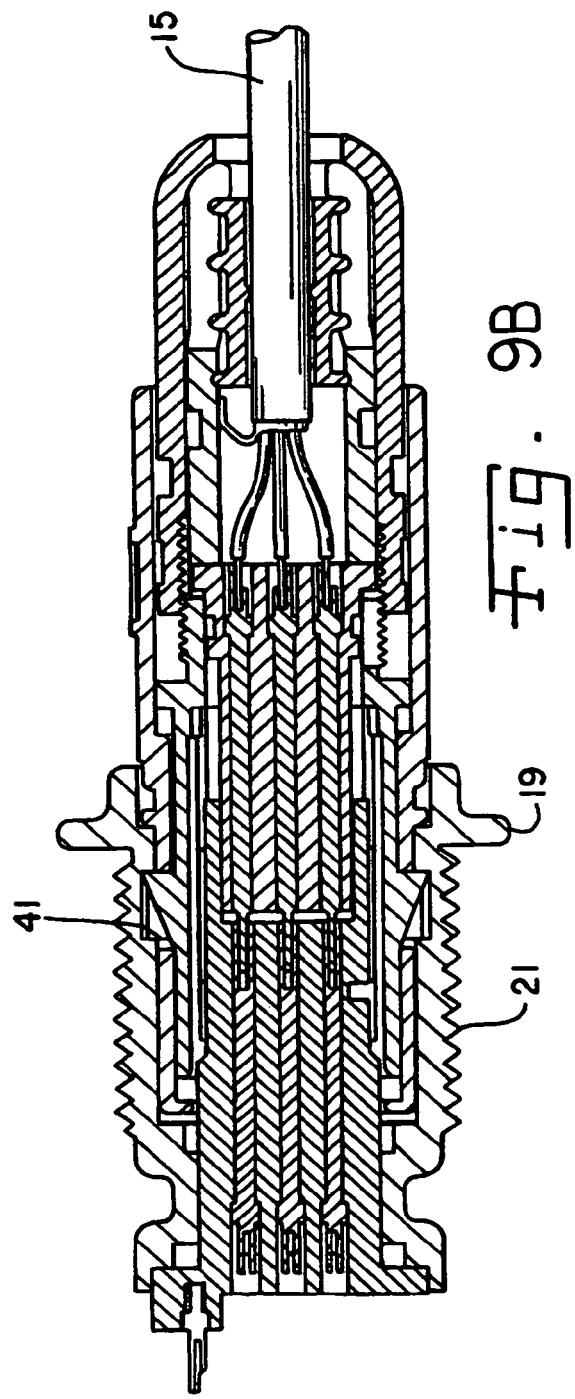

In an alternate embodiment of the invention, as shown in FIGS. 9A and 9B, an RF or electromagnetic interference (EMF) protection structure is shown and utilized. Connector assembly 10 in this embodiment is shown with a circular shield contact inserted about the cable leads within insulator positioner 50. Such cable shield is made of an electrically conductive material and connected to the ground lead or shielding of the inserted cable. Other portions of connector assembly 10, in particular, receptacle insulator 18, plug insulator 32, and insulator positioner 50 are coated with a metallic or conductive layer or substance to fully surround the leads of cable 15. The cable grip adjuster of this alternate embodiment as shown in FIGS. 9A and 9B is different than that of the primary embodiment shown elsewhere.

Figure 10A:
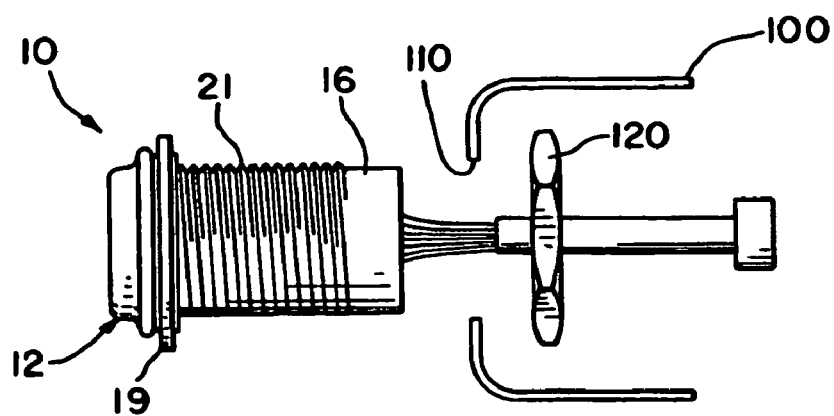
FIGS. 10A and 10B show alternate mounting arrangements to a customer equipment case.
Figure 10B:
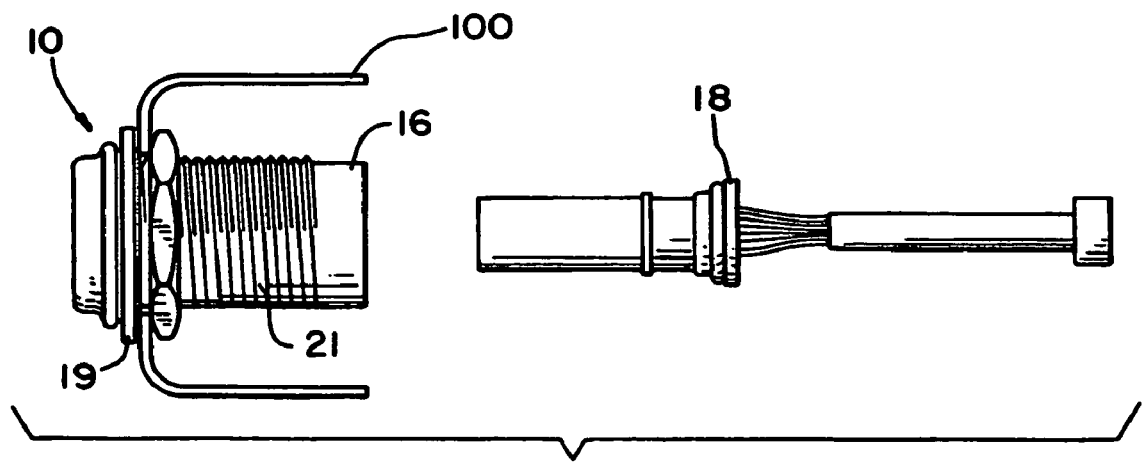

An additional feature of the present invention is the creation of alternate mounting arrangements of connector assembly 10 with the customer's equipment case or box 100. As shown in FIG. 10A, a front mounting installation is possible in which the receptacle assembly 12 is installed with the particular keying of the insulators as selected with the customer's wiring harness passing through an opening 110 in equipment case 100. Assembly of the leads takes place outside of box 100. The mounting proceeds by inserting the receptacle assembly 12 into the bore 110 while a panel nut 120 secures the receptacle 12 from the rear. In an alternate mounting, the receptacle assembly 12 is first inserted and connected to the customer's case 100 and the receptacle insulator is installed from the back, pushed through the receptacle case 16, and allowing the retention means 20 such as the one-way web or snap fit to selectively axially locate the insulator within receptacle case 16.

Construction materials for the connector assembly 10 may be made from convention materials such as plastics or metal, but are preferably injection molded for standardization and cost reduction. Alternate method of manufacturing and materials may be equivalently utilized.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of mounting a connector assembly to an equipment case, the connector assembly connecting together a first conduit and a second conduit, the method including:
    inserting a receptacle insulator into a receptacle case to form a receptacle assembly of a female receptacle connector of the connector assembly;
    retaining the receptacle insulator within the receptacle case using a retainer that axially positions the receptacle insulator in the receptacle case using a snap fit connection;
    passing a plurality of leads of the first conduit into corresponding bores in the receptacle insulator;
    inserting an end portion of the receptacle assembly into an opening in the equipment case; and
    securing the receptacle assembly to the equipment case.

2. The method of claim 1, further including:
    selecting a relative indexing of the receptacle insulator relative to the receptacle case; and
    inserting the receptacle insulator into the receptacle case based on the selected relative indexing.

3. The method of claim 1, wherein the connector assembly further includes a male plug connector, and the method further includes connecting the male plug connector to the female receptacle connector.

4. The method of claim 3, further including:
    inserting a plug insulator into a plug case to form a plug assembly of the male plug connector; and
    passing a plurality of leads of the second conduit into corresponding bores in the plug insulator.

5. The method of claim 4, further including:
    selecting a second relative position of the plug insulator relative to the plug case, the second relative position being one of a plurality of second predefined relative positions of the plug insulator relative to the plug case;
    inserting the plug insulator into the plug case; and
    positioning the plug insulator based on the selected second relative position.

6. The method of claim 4, further including interfitting the plug insulator with the receptacle insulator to connect the plug case to the receptacle case.

7. The method of claim 1, further including positioning a panel nut onto the end portion of the receptacle assembly to secure the receptacle assembly to the equipment case.

8. The method of claim 1, further comprising:
selecting a first relative position of the receptacle insulator relative to the receptacle case, the first relative position being one of a plurality of first predefined relative radial positions of the receptacle insulator relative to the receptacle case;
wherein the receptacle insulator is inserted into the receptacle case such that the receptacle insulator is positioned based on the selected first relative position.

9. A method of mounting a connector assembly to an equipment case, the connector assembly connecting together a first conduit and a second conduit, the method including:
inserting an end portion of a receptacle case into an opening in the equipment case;
sliding a securing device over the end portion of the receptacle case;
securing the receptacle case to the equipment case using the securing device;
passing a plurality of leads of the first conduit into corresponding bores in a receptacle insulator;
inserting an end portion of the receptacle insulator into the end portion of the receptacle case to form a receptacle assembly of a female receptacle connector of the connector assembly; and
retaining the receptacle insulator within the receptacle case using a retainer.

10. The method of claim 9, wherein the connector assembly further includes a male plug connector, and the method further includes connecting the male plug connector to the female receptacle connector.

11. The method of claim 10, further including:
inserting a plug insulator into a plug case to form a plug assembly of the male plug connector; and
passing a plurality of leads of the second conduit into corresponding bores in the plug insulator.

12. The method of claim 11, further including:
selecting a relative indexing of the plug insulator relative to the plug case; and
inserting the plug insulator into the plug case based on the selected relative indexing.

13. The method of claim 11, further including interfitting the plug insulator with the receptacle insulator to connect the plug case to the receptacle case.

14. The method of claim 9, wherein:
the securing device includes a panel nut; and
the step of sliding the securing device includes positioning the panel nut onto the end portion of the receptacle case to secure the receptacle case to the equipment case.

15. The method of claim 9, wherein the retainer retains the receptacle insulator within the receptacle case using a snap fit connection.

16. A method of mounting a connector assembly to an equipment case, the connector assembly connecting together a first conduit and a second conduit, the method including:
inserting an end portion of a receptacle case into an opening in the equipment case;
securing the receptacle case to the equipment case;
passing a plurality of leads of the first conduit into corresponding bores in a receptacle insulator;
selecting a first relative position of the receptacle insulator relative to the receptacle case, the first relative position being one of a plurality of first predefined relative radial positions of the receptacle insulator relative to the receptacle case;
inserting an end portion of the receptacle insulator into the end portion of the receptacle case and positioning the receptacle insulator based on the selected first relative position to form a receptacle assembly of a female receptacle connector of the connector assembly; and
retaining the receptacle insulator within the receptacle case using a retainer.

17. The method of claim 16, further including:
selecting a second relative position of the plug insulator relative to the plug case, the second relative position being one of a plurality of second predefined relative positions of the plug insulator relative to the plug case;
inserting the plug insulator into the plug case; and
positioning the plug insulator based on the selected second relative position.

18. The method of claim 17, wherein positioning the plug insulator based on the selected second relative position includes:
inserting a head of the plug insulator into a corresponding cutout in an insulator positioner, the head of the plug insulator being insertable into the cutout in a plurality of configurations to provide the plurality of second predefined relative positions of the plug insulator relative to the plug case; and
connecting the insulator positioned to the plug case.

19. The method of claim 16, wherein:
the receptacle case includes a cutout corresponding to a shape of a head of the receptacle insulator, the head of the receptacle insulator being insertable into the cutout in a plurality of configurations to provide the plurality of first predefined relative positions of the receptacle insulator relative to the receptacle case; and
positioning the receptacle insulator based on the selected first relative position includes inserting the head of the receptacle insulator into the cutout.

20. The method of claim 16, wherein the retainer retains the receptacle insulator within the receptacle case using a snap fit connection.

* * * * *